(12) United States Patent
Cloran et al.

(10) Patent No.: US 9,710,819 B2
(45) Date of Patent: Jul. 18, 2017

(54) REAL-TIME TRANSCRIPTION SYSTEM UTILIZING DIVIDED AUDIO CHUNKS

(75) Inventors: Michael Eric Cloran, Indianapolis, IN (US); David Paul Heitzman, Newtown, PA (US); Mitchell Gregory Shields, Noblesville, IN (US); Jeromey Russell Goetz, Kent, WA (US)

(73) Assignee: Interactions LLC, Franklin, MA (US)

( * ) Notice: Subject to any disclaimer, the term of this patent is extended or adjusted under 35 U.S.C. 154(b) by 1359 days.

(21) Appl. No.: 12/618,742

(22) Filed: Nov. 15, 2009

(65) Prior Publication Data

US 2010/0063815 A1 Mar. 11, 2010

Related U.S. Application Data

(63) Continuation-in-part of application No. 12/551,864, filed on Sep. 1, 2009, now Pat. No. 8,332,231, which
(Continued)

(51) Int. Cl.
*G10L 15/26* (2006.01)
*G06Q 10/10* (2012.01)
(Continued)

(52) U.S. Cl.
CPC .............. *G06Q 30/02* (2013.01); *G06Q 10/10* (2013.01); *G06Q 10/103* (2013.01); *G10L 15/26* (2013.01); *H04M 3/568* (2013.01)

(58) Field of Classification Search
CPC ....... G10L 15/08; G10L 15/26; G10L 15/265; G06Q 10/103; H04M 3/56; H04M 3/568
(Continued)

(56) References Cited

U.S. PATENT DOCUMENTS 3,905,042 A * 9/1975 Johnson ........................ 360/71
5,033,088 A 7/1991 Shipman
(Continued)

FOREIGN PATENT DOCUMENTS

| EP | 1 288 829 A1 | 3/2003 |
|---|---|---|
| WO | 02060161 | 8/2002 |
| WO | 03009175 A1 | 1/2003 |

OTHER PUBLICATIONS

European Patent Office, Summons to Attend Oral Proceedings Pursuant to Rule 115(1) EPC, European Patent Application No. 04751363.5, Jun. 14, 2013, six pages.
(Continued)

*Primary Examiner* — James Wozniak
(74) *Attorney, Agent, or Firm* — Fenwick & West LLP (57) ABSTRACT

A computing system accepts audio from one or more sources, parses the audio into chunks, and transcribes the chunks in substantially real time. Some transcription is performed automatically, while other transcription is performed by humans who listen to the audio and enter the words spoken and/or the intent of the caller (such as directions given to the system). The system provides for participants a user interface that is updated in substantially real time with the transcribed text from the audio stream(s). A single audio line can be used for simple transcription, and multiple audio lines are used to provide a real-time transcript of a conference call, deposition, or the like. A pool of analysts creates, checks, and/or corrects transcription, and callers/observers can even assist in the correction process through their respective user interfaces. Ads derived from the transcript are displayed together with the text in substantially real time.

14 Claims, 4 Drawing Sheets

Related U.S. Application Data is a continuation of application No. 10/839,536, filed on May 5, 2004, now Pat. No. 7,606,718.

(60) Provisional application No. 61/142,463, filed on Jan. 5, 2009, provisional application No. 60/467,935, filed on May 5, 2003.

(51) Int. Cl.
*H04M 3/56* (2006.01)
*G06Q 30/02* (2012.01)

(58) Field of Classification Search
USPC .................. 704/235, 270, 270.1; 348/14.08;
715/753; 379/202.1, 908; 705/1.1, 301
See application file for complete search history.

(56) References Cited

U.S. PATENT DOCUMENTS

| | | | |
|---|---|---|---|
| 5,199,062 A | | 3/1993 | Von Meister et al. |
| 5,483,588 A | | 1/1996 | Eaton et al. |
| 5,740,240 A | | 4/1998 | Jolissaint |
| 5,822,727 A | | 10/1998 | Garberg et al. |
| 5,855,003 A | * | 12/1998 | Ladden et al. ............ 704/270 |
| 5,884,032 A | | 3/1999 | Bateman et al. |
| 5,987,116 A | | 11/1999 | Petrunka et al. |
| 6,038,293 A | | 3/2000 | McNerney et al. |
| 6,058,435 A | | 5/2000 | Sassin et al. |
| 6,122,613 A | * | 9/2000 | Baker ................ G10L 15/22 704/235 |
| 6,161,087 A | * | 12/2000 | Wightman et al. .......... 704/215 |
| 6,292,830 B1 | | 9/2001 | Taylor et al. |
| 6,298,326 B1 | * | 10/2001 | Feller ................ G10L 15/32 379/75 |
| 6,311,231 B1 | | 10/2001 | Bateman et al. |
| 6,314,176 B1 | | 11/2001 | Gunasekar |
| 6,366,658 B1 | | 4/2002 | Bjornberg et al. |
| 6,370,508 B2 | | 4/2002 | Beck et al. |
| 6,377,921 B1 | | 4/2002 | Bahl et al. |
| 6,401,061 B1 | | 6/2002 | Ziemen |
| 6,411,686 B1 | | 6/2002 | Porter et al. |
| 6,442,247 B1 | | 8/2002 | Garcia |
| 6,442,269 B1 | | 8/2002 | Ehrlich et al. |
| 6,470,077 B1 | | 10/2002 | Chan |
| 6,473,505 B1 | | 10/2002 | Khuc et al. |
| 6,499,013 B1 | | 12/2002 | Weber |
| 6,535,848 B1 | * | 3/2003 | Ortega et al. ............ 704/235 |
| 6,587,558 B2 | | 7/2003 | Lo |
| 6,668,286 B2 | | 12/2003 | Bateman et al. |
| 6,721,416 B1 | | 4/2004 | Farrell |
| 6,831,966 B1 | | 12/2004 | Tegan et al. |
| 6,922,466 B1 | | 7/2005 | Peterson et al. |
| 6,925,167 B2 | | 8/2005 | Suder et al. |
| 6,961,699 B1 | * | 11/2005 | Kahn ................ G10L 15/26 704/235 |
| 7,133,513 B1 | * | 11/2006 | Zhang ................ 379/202.01 |
| 7,292,689 B2 | | 11/2007 | Odinak et al. |
| 7,466,812 B1 | | 12/2008 | Mahy et al. |
| 7,487,095 B2 | | 2/2009 | Hill et al. |
| 7,606,714 B2 | | 10/2009 | Williams et al. |
| 8,032,372 B1 | * | 10/2011 | Zimmerman ....... G06F 17/2818 381/98 |
| 8,332,212 B2 | * | 12/2012 | Wittenstein et al. ......... 704/211 |
| 8,335,689 B2 | * | 12/2012 | Wittenstein et al. ......... 704/235 |
| 8,412,521 B2 | * | 4/2013 | Mathias ............ G10L 15/063 704/235 |
| 8,442,197 B1 | * | 5/2013 | Mazza et al. ............ 379/202.01 |
| 8,498,872 B2 | * | 7/2013 | White et al. ............ 704/270.1 |
| 2001/0011366 A1 | | 8/2001 | Beck et al. |
| 2001/0037363 A1 | * | 11/2001 | Battilega ............ G06Q 30/02 709/204 |
| 2001/0044676 A1 | | 11/2001 | Macleod Beck et al. |
| 2002/0013949 A1 | | 1/2002 | Hejna |
| 2002/0032591 A1 | | 3/2002 | Mahaffy et al. |
| 2002/0086269 A1 | | 7/2002 | Shpiro |
| 2002/0152071 A1 | | 10/2002 | Chaiken et al. |
| 2002/0154757 A1 | | 10/2002 | Hack |
| 2002/0188454 A1 | * | 12/2002 | Sauber ............ 704/275 |
| 2003/0002651 A1 | | 1/2003 | Shires |
| 2003/0007612 A1 | | 1/2003 | Garcia |
| 2003/0009352 A1 | | 1/2003 | Bolotinikov et al. |
| 2003/0046101 A1 | | 3/2003 | Dow |
| 2003/0046102 A1 | | 3/2003 | Dow |
| 2003/0108183 A1 | | 6/2003 | Dhir et al. |
| 2003/0110023 A1 | | 6/2003 | Bangalore et al. |
| 2003/0177009 A1 | | 9/2003 | Odinak et al. |
| 2003/0179876 A1 | | 9/2003 | Fox et al. |
| 2003/0185380 A1 | | 10/2003 | Garin |
| 2003/0187988 A1 | | 10/2003 | Lee et al. |
| 2003/0212558 A1 | | 11/2003 | Matula |
| 2003/0215066 A1 | | 11/2003 | Shambaugh et al. |
| 2004/0004599 A1 | * | 1/2004 | Shepard ............ G06F 17/2247 345/156 |
| 2004/0049385 A1 | * | 3/2004 | Lovance ............ G10L 15/063 704/235 |
| 2004/0059841 A1 | | 3/2004 | Bateman et al. |
| 2004/0064317 A1 | * | 4/2004 | Othmer et al. ............ 704/260 |
| 2004/0093257 A1 | | 5/2004 | Rogers et al. |
| 2004/0162724 A1 | | 8/2004 | Hill et al. |
| 2005/0010407 A1 | * | 1/2005 | Jaroker ............ 704/235 |
| 2005/0163304 A1 | | 7/2005 | Judkins et al. |
| 2005/0177368 A1 | | 8/2005 | Odinak et al. |
| 2005/0259803 A1 | | 11/2005 | Khartabil |
| 2006/0058999 A1 | * | 3/2006 | Barker et al. ............ 704/256 |
| 2006/0074895 A1 | * | 4/2006 | Belknap ............ 707/4 |
| 2006/0149558 A1 | * | 7/2006 | Kahn et al. ............ 704/278 |
| 2006/0178886 A1 | * | 8/2006 | Braho et al. ............ 704/246 |
| 2007/0078806 A1 | * | 4/2007 | Hinickle ............ G06F 11/0751 |
| 2007/0276908 A1 | | 11/2007 | Asthana et al. |
| 2007/0286359 A1 | | 12/2007 | Odinak et al. |
| 2007/0299652 A1 | * | 12/2007 | Koll ............ G06F 17/211 704/9 |
| 2008/0056460 A1 | | 3/2008 | Odinak et al. |
| 2008/0133245 A1 | * | 6/2008 | Proulx et al. ............ 704/277 |
| 2008/0243514 A1 | * | 10/2008 | Gopinath et al. ............ 704/270 |
| 2008/0281785 A1 | * | 11/2008 | Jang et al. ............ 707/3 |
| 2008/0319743 A1 | * | 12/2008 | Faisman ............ G10L 15/065 704/235 |
| 2008/0319744 A1 | * | 12/2008 | Goldberg ............ 704/235 |
| 2009/0052636 A1 | * | 2/2009 | Webb et al. ............ 704/235 |
| 2009/0052646 A1 | | 2/2009 | McGowan et al. |
| 2009/0124272 A1 | * | 5/2009 | White et al. ............ 455/466 |
| 2009/0141875 A1 | * | 6/2009 | Demmitt ............ H04M 3/4878 379/88.14 |
| 2009/0204470 A1 | * | 8/2009 | Weyl ............ G06Q 10/06311 705/7.13 |
| 2009/0276215 A1 | * | 11/2009 | Hager ............ 704/235 |
| 2009/0306981 A1 | * | 12/2009 | Cromack et al. ............ 704/235 |
| 2009/0319265 A1 | * | 12/2009 | Wittenstein et al. ............ 704/234 |
| 2009/0326939 A1 | * | 12/2009 | Toner ............ H04M 1/656 704/235 |
| 2010/0063815 A1 | * | 3/2010 | Cloran et al. ............ 704/235 |
| 2010/0125450 A1 | * | 5/2010 | Michaelangelo ... G06F 17/2725 704/9 |
| 2010/0177877 A1 | * | 7/2010 | Hamaker ............ H04M 3/53358 379/88.14 |
| 2010/0268534 A1 | * | 10/2010 | Kishan Thambiratnam et al. ............ 704/235 |
| 2011/0099011 A1 | * | 4/2011 | Jaiswal ............ 704/235 |
| 2011/0112833 A1 | * | 5/2011 | Frankel et al. ............ 704/235 |

OTHER PUBLICATIONS

Australian Patent Office, Examiner's First Report, Australian Patent Application No. 2004-237227, Nov. 6, 2009, two pages.
Australian Patent Office, Examiner's Second Report, Australian Patent Application No. 2004-237227, Sep. 9, 2010, two pages.
European Patent Office, Examination Report, European Patent Application No. EP 04751363.5, May 18, 2005, six pages.
Indian Patent Office, Examination Report, Indian Patent Application No. 2875/CHENP/2005, Jun. 16, 2009, two pages.

(56) References Cited

OTHER PUBLICATIONS

Indian Patent Office, First Examination Report, Indian Patent Application No. 2875/CHENP/2005, Jun. 18, 2008, two pages.
New Zealand Intellectual Property Office, Examination Report, New Zealand Patent Application No. 543885, Oct. 3, 2008, two pages.
New Zealand Intellectual Property Office, Examination Report, New Zealand Patent Application No. 543885, Apr. 30, 2009, two pages.
Anonymous, "Let your voice do the walking," Call Center Magazine, Nov. 2002, six pages. [Online] [Retrieved Apr. 5, 2013] Retrieved from the Internet <URL:http://search.proquest.com/docreview/202906484/13D3FFC365321337C5EB/9?accountif+14>.
United States Office Action, U.S. Appl. No. 13/708,264, Mar. 20, 2013, six pages.
United States Office Action, U.S. Appl. No. 12/618,743, Dec. 28, 2011, ten pages.
Coombs, Art, "Call Center Site Selection Methodology." Teleprofessional International, pp. 41-45 (Sep./Oct. 1996).
Coombs, Arthur, "The Staffing Challenge." Teleprofessional International, pp. 24-26 (Jan./Feb. 1997).
Canadian Intellectual Property Office, Requisition by the Examiner, Canadian Patent Application No. 2,524,591, Jun. 6, 2012, 2 pages.
United States Patent and Trademark Office, Office Action, U.S. Appl. No. 12/551,864, Jun. 14, 2012, 12 pages.
United States Office Action, U.S. Appl. No. 12/618,743, Apr. 9, 2012, twelve pages.
United States Office Action, U.S. Appl. No. 14/136,003, Aug. 20, 2014, seven pages.
Canadian Intellectual Property Office, Office Action, Canadian Patent Application No. 2,524,591, Dec. 11, 2013, three pages.
United States Office Action, U.S. Appl. No. 14/136,003, Feb. 24, 2014, six pages.
United States Office Action, U.S. Appl. No. 14/136,003, Apr. 17, 2015, 10 pages.

* cited by examiner

REAL-TIME TRANSCRIPTION SYSTEM UTILIZING DIVIDED AUDIO CHUNKS

REFERENCE TO RELATED APPLICATIONS

This application is a nonprovisional of and claims priority to U.S. Provisional Application No. 61/142,463, which was titled "Real-Time Conference Call Transcription" and filed on Jan. 5, 2009. This application also claims priority to U.S. patent application Ser. No. 12/551,864, filed on Sep. 1, 2009, with title "Apparatus and Method for Processing Service Interactions," now U.S. Pat. No. 8,332,231, issued Dec. 11, 2004; which is a continuation of U.S. Pat. No. 7,606,718, titled "Apparatus and Method for Processing Service Interactions," issued on Oct. 20, 2009; which was a nonprovisional of U.S. Provisional Application No. 60/467,935, titled "System and Method for Processing Service Interactions" and filed on May 5, 2003. The application is also related to U.S. Provisional Application No. 61/121,041, titled "Conference Call Management System" and filed on Dec. 9, 2008, and a commonly assigned US application titled "Conference Call Management System" filed on Nov. 15, 2009, now U.S. Pat. No. 8,223,944, issued Jul. 17, 2012. All of these applications are hereby incorporated by reference herein as if fully set forth.

FIELD

The present invention relates to telephonic communications. More specifically, the present invention relates to interaction with an external, non-telephone network.

DESCRIPTION

For the purpose of promoting an understanding of the principles of the invention, reference will now be made to certain embodiments illustrated herein, and specific language will be used to describe the same. It should nevertheless be understood that no limitation of the scope of the invention is thereby intended, such alterations and further modifications to the illustrated device, and such further applications of the principles of the invention as illustrated therein being contemplated as will occur to those skilled in the art to which the invention relates.

Generally, this system relates to automated processing of human speech, using human analysts to transcribe the speech into text and performing automated processing of the text. In some embodiments, the speech is captured from a conference call, while in others, it is captured by a user interacting with the system alone. Other applications of this technology will occur to those skilled in the art in view of this disclosure.

Figure 1:
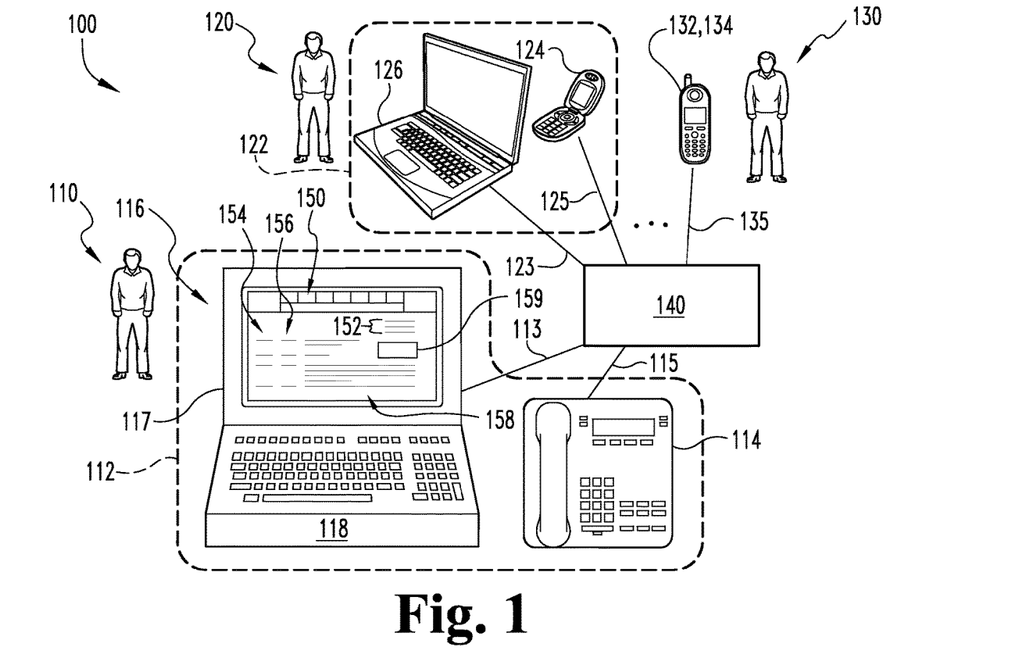
FIG. 1 is a block diagram of participants in a verbatim transcription system according to one embodiment of the present description.

FIG. 1 schematically illustrates the participants in a conference call that uses some of the principles of the present description. The overall system 100 connects users 110, 120, and 130 by way of their respective terminal equipment 112, 122, and 132, and the central system 140. Each participant in the call 110, 120, and 130 has at least a voice connection 115, 125, and 135 to central system 140 through a telephone 114, 124, and 134, while one or more participants 110, 120, and 130 may also have a data connection 113 or 123 with central server 140 through computing devices such as computer 116 and laptop computer 126. The computing devices 116 and 126 in this embodiment include a display (such as a monitor 117) and input devices 118 (such as a keyboard, mouse, trackball, touchpad, and the like). Additional persons who are not participating in the conference call may also connect by computer with central system 140 through a data link that is not associated with any particular voice connection, though in some embodiments the system discourages or prevents this using authentication or coordination measures, such as prompting for entry through the data connection of information or passcodes supplied through the voice connection.

Generally, participants 110, 120, and 130 conduct the voice portion of a conference call using techniques that will be understood by those skilled in the art. While the call is in progress, using the techniques and technologies presented in this disclosure, the system presents a real-time transcription of the call. In this example embodiment, participant 110 uses a web browser 150 to access a webpage or other interface associated with the call. Browser 150, displaying that page, shows a list 152 of the participants 110, 120, and 130 in the call. Browser 150 also displays a transcript of the conference call in substantially real time, including the timestamp 154 for each chunk of audio from a particular speaker, speaker tag 156, and text that was spoken 158. This data is captured and/or generated in this embodiment by central system 140 as discussed herein, though other embodiments apply distributed or federated capture, processing, formatting, and display. As the conference call proceeds, timestamps 154, speaker tags 156, and transcript 158 scroll in browser 150 or otherwise accumulate as will occur to those skilled in the art.

Figure 2:
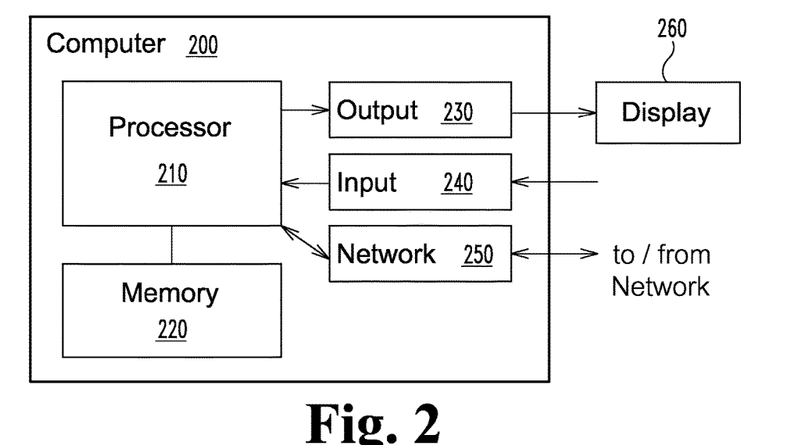
FIG. 2 is a schematic diagram of a computer for use, in various forms, in various components of the systems described herein.

The computers used as servers, clients, resources, interface components, and the like for the various embodiments described herein generally take the form shown in FIG. 2. Computer 200, as this example will generically be referred to, includes processor 210 in communication with memory 220, output interface 230, input interface 240, and network interface 250. Power, ground, clock, and other signals and circuitry are omitted for clarity, but will be understood and easily implemented by those skilled in the art.

With continuing reference to FIG. 2, network interface 250 in this embodiment connects computer 200 a data network (such as to network 370, discussed below in relation to FIG. 3) for communication of data between computer 200 and other devices attached to the network. Input interface 240 manages communication between processor 210 and one or more push-buttons, UARTs, IR and/or RF receivers or transceivers, decoders, or other devices, as well as traditional keyboard and mouse devices. Output interface 230 provides a video signal to display 260, and may provide signals to one or more additional output devices such as LEDs, LCDs, or audio output devices, or a combination of these and other output devices and techniques as will occur to those skilled in the art.

Processor 210 in some embodiments is a microcontroller or general purpose microprocessor that reads its program from memory 220. Processor 210 may be comprised of one or more components configured as a single unit. Alternatively, when of a multi-component form, processor 210 may have one or more components located remotely relative to the others. One or more components of processor 210 may be of the electronic variety including digital circuitry, analog circuitry, or both. In one embodiment, processor 210 is of a conventional, integrated circuit microprocessor arrangement, such as one or more CORE 2 QUAD processors from INTEL Corporation of 2200 Mission College Boulevard, Santa Clara, Calif. 95052, USA, or ATHLON or PHENOM processors from Advanced Micro Devices, One AMD Place, Sunnyvale, Calif. 94088, USA, or POWER6 processors from IBM Corporation, 1 New Orchard Road, Armonk, N.Y. 10504, USA. In alternative embodiments, one or more application-specific integrated circuits (ASICs), reduced instruction-set computing (RISC) processors, general-purpose microprocessors, programmable logic arrays, or other devices may be used alone or in combination as will occur to those skilled in the art.

Likewise, memory 220 in various embodiments includes one or more types such as solid-state electronic memory, magnetic memory, or optical memory, just to name a few. By way of non-limiting example, memory 220 can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; or a plurality and/or combination of these memory types. Also, memory 220 is volatile, nonvolatile, or a hybrid combination of volatile and nonvolatile varieties.

Figure 3:
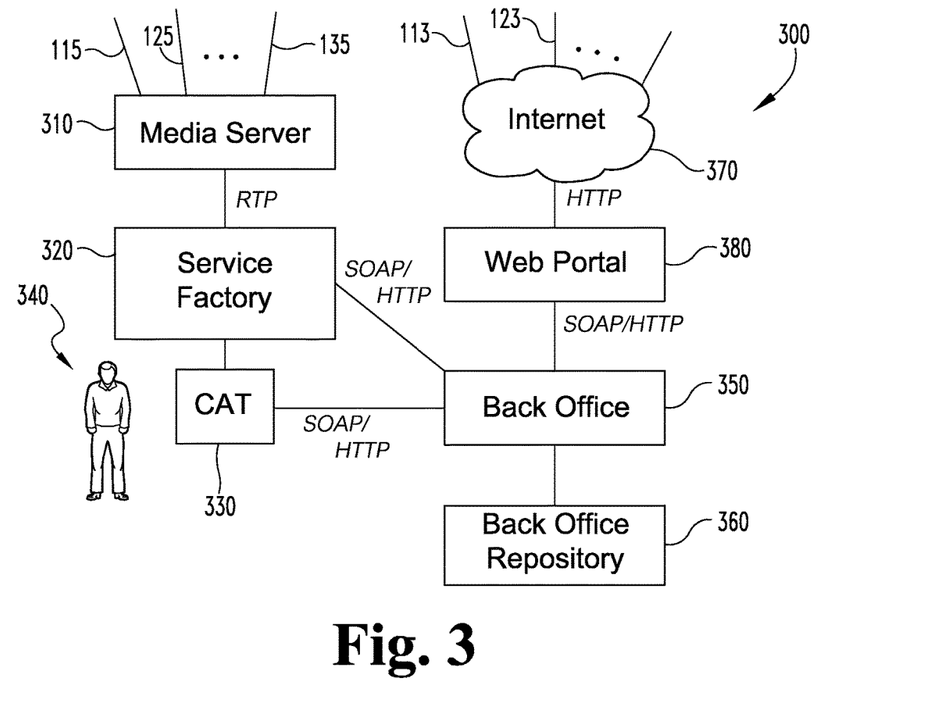
FIG. 3 is a block diagram of data flow through a system implementing the arrangement of FIG. 1.

FIG. 3 illustrates data flow through one embodiment of the present invention. System 300 includes media server 310, into which voice connections 115, 125, and others run. In various embodiments, media server 310 is a CMS-9000 server from RadiSys (5445 NE Dawson Creek Drive, Hillsboro, Oreg. 97124), which manages the audio connections, whether they be POTS, VOIP, or other type. Alternative servers and platforms include the Dialogic 60893 (available from Dialogic Inc., 1515 Route 10 East, Parsippany, N.J. 07054), instances of the open-source Asterisk project (see http://www.asterisk.org), and others that will occur to those skilled in the art.

Media server 310 converts the audio coming in through each channel into a digital stream, which might be encoded in any of a wide variety of ways for processing as will occur to those skilled in the art. In some embodiments, media server 310 is programmed to recognize and ignore portions of the respective audio streams that correspond to silence or mere background noise. In some of these embodiments, detection of audio other than silence and background noise is simply detecting sounds that exceed a particular line volume, while in other embodiments more complex algorithms are implemented for the identification of audio corresponding to speech, as will occur to those skilled in the art.

When media server 310 receives a new audio connection, it allocates resources for the "port" to be connected to other ports in one or more conferences, as discussed herein. Initially, in this embodiment, the call's port is placed into a new "feature conference" with service factory 320. The call's audio is routed to service factory 320, and audio output from service factory 320 is routed to the call's port. As the system interacts with the caller to determine which conference he or she wants to be connected to, the exchange occurs through this conference. Once that conference is identified, the caller's port is added to the set of ports associated with that "main conference," the caller's audio is sent to that main conference, and the audio from others in the conference is sent to the caller. Chunking and transcription of the caller's audio in this embodiment are performed by service factory 320 by way of the connection to the feature conference. In some implementations, this connection and conference are maintained for the duration of the call, while in others, this connection and conference are torn down when not needed and rebuilt as necessary.

As service factory 320 captures audio from a conference call participant, it associates the audio data with the particular line from which it came. For a POTS line, the line might be identified by ANI data, for example, while VOIP data might be identified by its association with a particular user of a particular service. Other identifiers may be available for other kinds of audio streams and can be adapted for use in the present system by those skilled in the art in view of this disclosure.

In addition, service factory 320 divides each stream of audio data (from respective audio lines) into non-noise/non-silence utterances, or "chunks" or "snippets," splitting the audio stream at moments that are apparently moments of silence between words or sentences. In some embodiments, the audio chunks may overlap, while in other embodiments the chunks are always distinct.

Finally, in some embodiments, service factory 320 retains (or manages retention of) the audio captured from each audio line 115, 125, etc. In such embodiments, the audio may be archived to provide a complete record of the conference call. For example, service factory 320 might stream the audio to back office system 350, which tags and archives all audio streams (or only those for which archival is requested and/or purchased) in back office repository 360.

Using techniques such as those described in the Service Factory Application, service factory 320 causes each audio snippet to be played through a computer-aided transcription ("CAT") terminal 330 for at least one analyst 340. Analyst 340 provides input to CAT terminal 330 that reflects his or her transcription of the audio snippet as will occur to those skilled in the art. CAT terminal 330 communicates these results to service factory 320, which relays them to back office system 350. Back office system 350 in this embodiment uses SOAP over HTTP to communicate with other elements of system 300, though other protocols will be used in other embodiments. In parallel with the operation of CAT terminal 330, service factory 320 communicates the audio data to back office system 350, also using SOAP over HTTP. Back office system 350 stores the audio data and transcription in back office repository 360 using the JDBC protocol in this embodiment, though other protocols will be used in other embodiments.

For situations where an incoming line is connected to a speakerphone serving multiple speakers, CAT terminal 330 enables analyst to enter into the transcript an indication that the speaker on that line has changed. This annotation may appear in the transcript in line with the text 158 or as a distinct speaker tag 156 (see FIG. 1).

In the present embodiment, a large pool of CAT terminals 330 and associated analysts 340 operate in parallel, each transcribing incoming audio chunks from all audio sources as quickly and accurately as they can. Since the audio is captured and isolated on a line-by-line basis, this transcription is somewhat more straightforward and results in clearer transcription than typical transcription of multiparty conversations by court reporters and the like.

This parallel operation of analysts 340 and CAT terminals 330 allows system 300 to transcribe speech from multiple speakers at once, and even transcribe multiple calls at once. Further, in some embodiments, service factory 320 is programmed to send at least some audio chunks to multiple CAT terminals 330 and analysts 340. The transcript provided by those analysts 340 are compared, and if they are the same, the result is committed to back office repository 360 and displayed for callers having a data connection. If one transcript of an audio chunk does not match the other, the audio chunk might be played for a third "tie breaker" analyst 340 through a third CAT terminal 330. Meanwhile, a placeholder might be displayed in the output stream for users watching the transcription through a data connection in some embodiments, while in other embodiments the transcript by one of the analysts (such as the one with the first result, or the one with a history of providing more accurate results) is placed into the output stream. If the transcript created by the third analyst 340 agrees with one of the first two analysts, then that transcript of the audio chunk is placed into the output stream in place of the placeholder or original version. If the tiebreaker does not agree with either of the original transcriptions, then further tiebreakers are queried or additional attempts are made.

If an audio chunk is inaudible or cannot be transcribed for some other reason, analyst 340 provides input through CAT terminal 330 accordingly. The system might respond by attempting transcription through one or more other analysts 340 and, if they are able to transcribe the audio chunk, using that transcript. If the system 300 cannot transcribe the audio chunk, a notation might be placed in the output stream or nothing may be output. In addition to or instead of either of those actions, system 300 might provide a signal to media server 310 to adjust the audio capture parameters (line gain, noise cancellation threshold, or the like) for that particular line so that future audio chunks might be dealt with more successfully. "Noise" indications by analysts may even result in an automatic adjustment of the sensitivity levels of that participant's audio capture device.

Before, during, or after the setup of the call through voice connections 115, 125, 135, etc., data connections 113, 123, etc. are established between computer equipment 116, 126, etc. through internet 370 to web portal system 380, using HTTP, for example. In response, web portal 380 displays a webpage showing the status of the call as described in relation to FIG. 6. In some embodiments, web portal 380 maintains a SOAP/HTTP connection with back office 350, receiving updates to the transcript as new chunks are transcribed and corrections are made. Web portal 380 then updates the display on various client devices through a corresponding reverse data connection through internet 370 and data connections 113, 123, etc. to the data equipment that is connected to the system.

This access to the conference webpage preferably includes an authentication step wherein a particular caller identifies himself or herself to the system 300. That identity information and/or an associated name, alias, avatar, nickname, or the like is used as the "speaker tag" 156 for the transcripts 158 of that person's audio chunks.

The system and data flow shown in FIG. 3 illustrate a "fidelity mode" called "verbatim interpreting," in which human analysts 340 provide a substantially verbatim transcription of the spoken words. Another "fidelity mode" is known as "text interpreting." In this mode, an analyst 340 listens to an audio chunk and provides input via CAT terminal 340 of text that has substantially the same meaning as the words originally spoken in the conference call, though the transcript may not be a verbatim recording of it. When the "text interpreting" mode is used, the analyst need not be a trained transcriptionist, though training in text interpretation may still be beneficial. Even then, the cost of staffing the system with this type of analyst is significantly less than that for staffing with transcriptionists.

Figure 4:
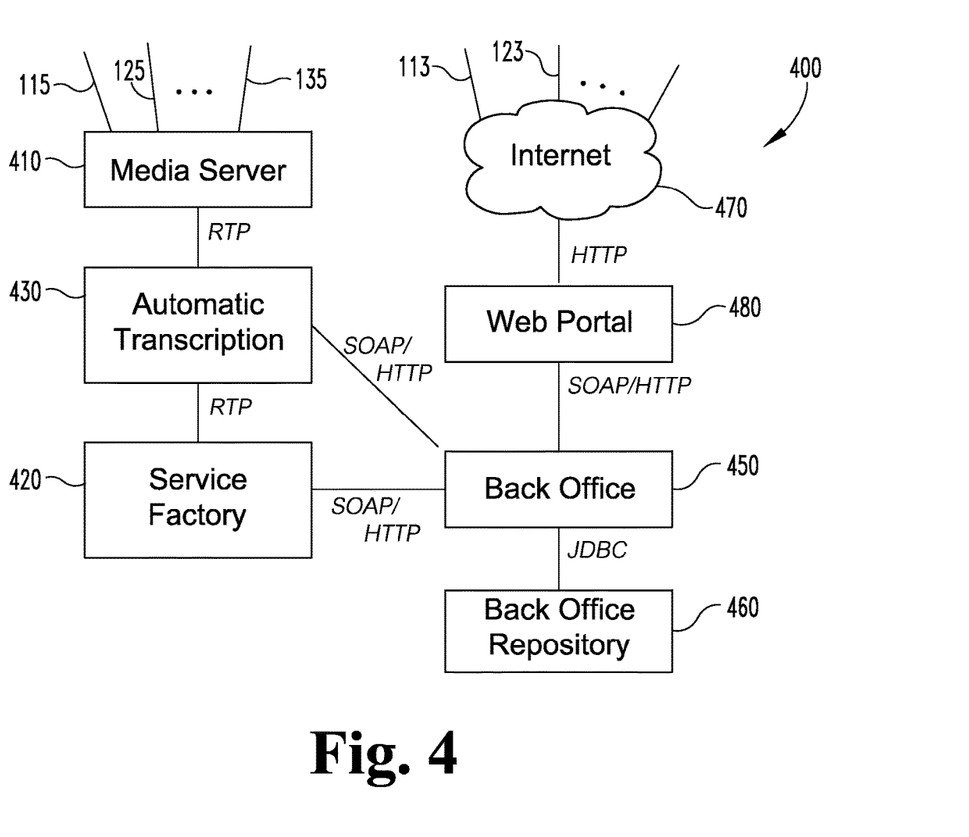
FIG. 4 is a block diagram of a system for automatic transcription according to another embodiment of the present description.

A third "fidelity mode" is "automatic transcription." Automatic transcription provides the lowest level of quality at the lowest cost of the three fidelity modes discussed herein. A system implementing this mode is illustrated in FIG. 4 as system 400. As in system 300, audio lines 115, 125, etc. are connected to and provide audio to media server 410, which detects (and, if necessary, digitizes) the audio, and parses it into chunks. In system 400, the chunks are transferred using RTP to automatic transcription subsystem 430, which automatically processes each chunk. Automatic transcription subsystem 430 sends the audio chunk to service factory 420 along with its best guess(es) as to the transcription of that audio, plus an indication of the system's confidence in that transcription. That data is also sent using SOAP/HTTP to back office 450, which manages storage of and accounting for that data. The back office system 450 stores the audio, transcription, and accounting data in back office repository 460. Meanwhile, user access through data lines 113, 123, etc., internet 470, and web portal 480 operates according to the analogous processes discussed in connection with FIG. 3.

Automatic transcription subsystem 430 uses speaker-independent analysis in some embodiments, while in others the subsystem 430 is trained (for example, during a registration process) to recognize the particular speech of a given speaker. In other such implementations, the transcript correction systems discussed herein are used to develop speaker-specific profiles that improve over time.

In a variation on this technique, an analyst listens to the speech of the conference call participant and repeats the words into a microphone. The automated transcription subsystem converts the analyst's speech into text that is then associated with the speech of the conference call user. This type of operation adds some delay relative to fully automated processing, but has the advantage of being able to control the ambient audio conditions and to manage speaker-specific profiles for a smaller number of speakers (the pool of analysts being presumably smaller than the universe of potential conference callers). In one variation on this variation, analysts are used in this fashion only when the automated transcription subsystem has a level of confidence in its results that is below a particular threshold. The analyst is then presented with the audio and repeats the speech as an input into the automatic transcription subsystem 430. If the system again fails to transcribe the text with a certain level of confidence, other methods are used for the transcription of that audio chunk as are described herein.

The system preferably offers users a continuously variable level approach to managing the fidelity of the transcription, either automatically or at the request of the user. Using this approach, the web portal allows users to view the transcript while the conference is occurring. A first level of transcription is performed through machine-based transcription, or automated transcription. Then, in the various user interfaces, a leader or other participant in the conference call is able to click a portion of the transcript that he or she feels is not accurate. That segment of the transcript is then re-transcribed either using the next better level of fidelity of service, or by a particular level of service that the user selected when marking the segment as not being accurate, as will be understood by those skilled in the art in view of this disclosure. The caller or leader would only be charged for the higher levels of service for the segments of the transcript that were identified as needing it.

Real-Time Transcription of Conference Calls

In this embodiment, a transcript of the conference call is shown to at least one of the participants 110, 120, and 130 or other parties (not shown) via a user interface in substantially real time. The transcript visually connects the name of (or another identifier for) the speaker 156 alongside the words they have spoken 158. The user interface is, for example, a browser-based interface 150, a mobile computing device display (not shown), or the like. In some forms of this embodiment, if an error appears in the transcript 158, it can be corrected in any of a variety of ways discussed herein, and the user interface is updated accordingly. Some of these corrections may be initiated by humans working with, or computers operating in the system, while others may be initiated by call participants.

Newly transcribed passages and newly issued corrections are provided as updates to the user interface in substantially real time. Advertisements 159 relevant to the text (and updates) in the transcript 158 are provided and updated in connection with the display of the transcript 158 in the user interface.

In some embodiments, transcription of spoken audio is achieved in central system 140 using a "service factory" paradigm as described in U.S. Published Application No. 2005/0002502 (the "Service Factory Application"), which is hereby incorporated fully by reference to the extent it is consistent with or could be adapted for use with this disclosure. Conference call management and processing of related data are achieved in some embodiments by the system disclosed in U.S. Provisional Patent Application 61/121,041, which is also incorporated fully by reference to the extent it is consistent with or could be adapted for use with this disclosure by those skilled in the relevant art.

Advertising Based on Real-Time Translation

Advertising links associated with the text are generated in various ways as a function of the text in the transcription, and in some embodiments are updated when corrections are made to the transcription text. Some implementations will use a single source for advertisements, while others use multiple providers either for retrieving ads connected with different portions of the same transcript, or for different transcripts. The transcript text in some embodiments is passed through an ad-fetching process in a serialized sequence of server-side processing, while in others an ad-serving subsystem is consulted in parallel with the server's composition of a page or transmission to the user interface of an update to the transcript text, and in still others client-side scripting retrieves relevant ads from the ad server after the transcript text is received or updated, or while it is being displayed.

For example, sponsored links are advertisements integrated into the content of a website. A website provider typically contracts with a third-party provider who has a revenue-sharing model that uses a bid market for particular terms. A party placing an ad pays a price according to the current value and competition for that particular ad and the market spaces in which it is placed. There are various implementations and third-party providers of such services, and these can be integrated into the current system as will occur to those skilled in the art.

Figure 5:
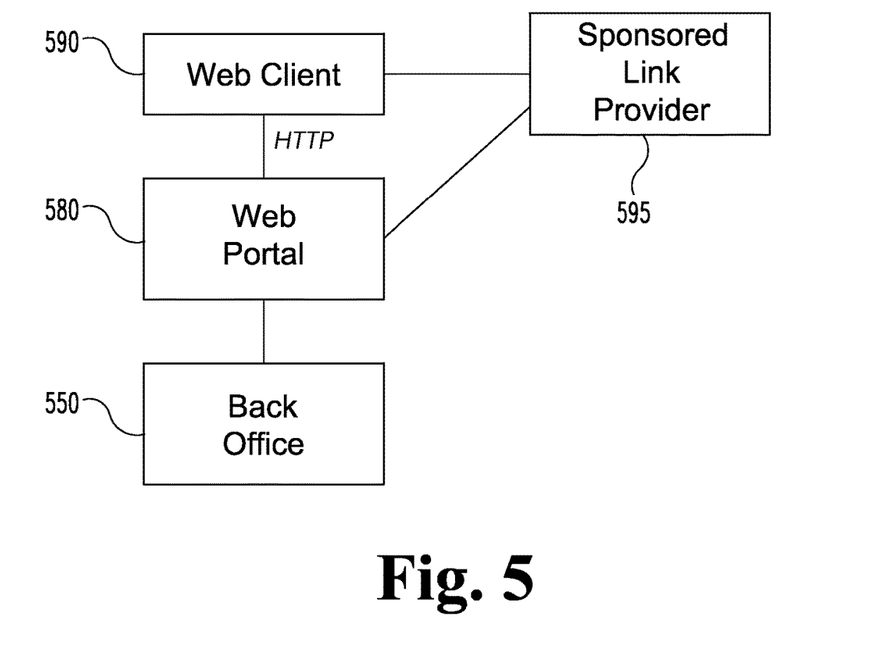
FIG. 5 is a block diagram of the ad retrieval portion of a web portal system according to yet another embodiment of the present description.

One example of data flow through a system according to the present description is illustrated in FIG. 5. In this embodiment, web client 590 (such as browser 150 or other client, as will occur to those skilled in the art) requests a transcription update from web portal 580 using javascript. In response, the web portal 580 issues SOAP requests to back office 550 to retrieve updates to the transcript. Before the web portal 580 responds to the web client 590, it issues a web service request to a third party provider 595 with the updated segments of the transcription. Third party provider 595 uses the updated segments as input to its algorithms for choosing ads to be displayed in connection with those segments. Provider 595 responds to web portal 580 with a list of words and associated ads. Web portal 580 then responds to the web client 590 with the updated transcription containing sponsored links.

In various embodiments, "web portals" 380, 480, and 580 are web application servers, such as those built on Apache, J2EE, Zend, Zope, and other application servers as will occur to those skilled in the art. Similarly, back office systems 350, 450, and 550 are preferably implemented as J2EE modules. In various embodiments, back office repository 360, 460, and 560 are implemented in monolithic and/or distributed databases, such as those provided by the MySQL (http://www.mysql.com) or PostgreSQL (http://www.postgresql.org) open source projects, or Oracle Database 11g (published by Oracle Corporation, 500 Oracle Parkway, Redwood Shores, Calif. 94065) or the DB2 database, published by IBM. A variety of other application servers and database systems may be used as will occur to those skilled in the art.

In some embodiments, audio chunks are limited to a particular maximum length, either in terms of time (such as a 20-second limit) or data size (such as a 64 kB limit).

Some embodiments provide a "clean" transcription of a multi-line conference because each audio line is isolated and processed individually. An extra benefit of many embodiments is that real-time transcription of a conference call being integrated with sponsored links generates very valuable ad space.

The association between each audio line of a call and the individual user talking on that line allows the system to generate real-time transcripts that link actual names, user names, personal symbols, avatars, and the like with the text spoken by that user.

In some alternative embodiments, intent analysts transcribing an audio chunk also identify and tag information that either should not be transcribed or should not be included in the transcript. For example, the audio might reflect an instruction to the system for management of the conference call, such as adding a party, muting a line, dialing a number, going "off the record," going back "on the record," and the like. In such embodiments and situations, the analyst provides input to the system that characterizes the call participant's intent, such as what the person is asking the system to do. The system automatically responds accordingly.

Transcription as described herein can also occur outside the conference call context. For example, a single caller might place a telephone call to a system as described herein, and the audio from the call can be transcribed and otherwise processed in real time using one or more of the fidelity levels of transcription also described herein. Instructions to the system can be captured as just described, and the system responds appropriately. Real-time feedback can be given to the user, such as confirming that commands had been received and/or requesting additional information, as necessary or desired.

Updates and corrections to the transcript text are, in some embodiments, sent to the user interface as soon as possible. In some of these embodiments, updates are provided on a per-word basis, while in others updates are sent with each keystroke of the analyst, or with other frequency as will occur to those skilled in the art.

Analyst's transcriptions are preferably scored for one or more purposes, such as their compensation, their reliability monitoring, quality control, and prioritizing of different transcriptions of the same audio for display while the difference is arbitrated.

Transcript Correction

In some embodiments, if the user providers a correction to a portion of the transcript, the original transcription of that audio chunk is marked as "bad," the original text is replaced in each user interface, and the performance data for the analyst(s) who originally transcribed the text are updated (negatively). In some embodiments, the user interface through which a call participant views the real-time transcript includes live links, menus, or other user interface features for manipulating, acting on, using, or correcting the text. In various embodiments, these actions include adding contact information to the observer's contact list, marking inaccurate transcription, searching an internet search engine, dictionary, database, or other resource for data or words that appear in the transcription, and the like.

When the user deems a portion of the transcript to be inaccurate, some implementations of the system allow the observer to use the user interface to mark that word or passage as inaccurately transcribed, and the system may respond by providing the audio to one or more additional analysts for transcription and double-checking. If the relevant audio chunk had already been presented to analysts who provided different transcriptions, the user interface might respond to input from the observer by presenting the alternative transcriptions (by the other analyst(s)) for easy selection. Some embodiments even enable the observer to directly enter various implementations of such user interfaces presented the original and corrected transcriptions, each with an indication as to the source of that particular version. Analysts are preferably compensated based on their performance. In some embodiments, compensation is a function of the number of words the analyst produces in transcripts, among other factors. In some embodiments, the analyst's pay is determined as a function of the amount of time of audio that the analyst transcribes, among other factors. In some embodiments, accuracy is a factor in determining analyst's compensation.

In some embodiments, analysts are notified if any of their transcription segments are characterized as incorrect, as it often affects their compensation. They have an incentive, therefore, to provide good work product in the first instance, but also to check those segments marked as "bad" or "incorrect," and to learn from their mistakes. In addition, recourse is preferably provided for analysts who believe that, although a segment was marked "bad," it was, in reality, correct. An authoritative person (such as the supervisor of the analyst corps) reviews the audio and makes a final determination as to the best transcript. If the original analyst was correct, they are rewarded for their original accuracy, as well as for appealing, which yields the correct results, both for users (in the transcript) and in the scoring (as between the original analyst and the "double checking" analyst). If the double-checking analyst or the observer is determined to have been correct, the original analyst is penalized for instigating a losing appeal (as well as for the wrong interpretation), and the second analyst or caller is rewarded for the correction.

When a user flags a transcription segment as "bad," or if double-checking determines that an original transcription may be inaccurate or if automated double-checking is not resolved with a satisfactory level of confidence, a "correction work unit" is generated by the system, such as at service factory 320 or 420. This work unit is sent to appropriately trained and skilled analysts, and their responses are processed to correct errors and remove "bad" tags that were improperly applied.

In systems that use machine transcription to any extent, human analysts are preferably given the opportunity to review and correct the automatically generated transcript. Analysts in some embodiments type the correct text into an analyst's interface (preferably, but not necessarily, populated by the best guesses from the transcription software).

In an alternative embodiment, error checking is performed using special "error-checking work units" in the service factor 320 or 420 described above. The system processes such a work unit by either sending the relevant audio to one or more additional analysts as described above, or by showing an analyst the differences between prior interpretations of the audio and allowing the analyst to select between them (or choose another, or indicate that the best transcription is not listed), or shift the task to the conference users by presenting the options in their user interfaces and accepting (or at least annotating) the selection.

In some embodiments, a spelling checker is implemented in the analyst's interface to avoid obvious typographical errors in the transcript. Similarly, auto-complete features can be implemented in the analyst's user interface, these preferably being organized and presented so that the most likely transcription of the utterance is easily and efficiently selected.

In one example of the "continuously variable level" approach, the audio stream initially goes to the transcription service. The transcription service applies the automated voice transcription method and displays the transcript to users via the user interface, such as a web or other client interface. When a user decides that a segment of the transcription needs to be re-transcribed, the user clicks on that segment in the web client. That click triggers a javascript process to issue an HTTP request containing an identifier for the transcription segment in need of re-transcribing to the web portal server. The web portal server contains a JAVA servlet designed to handle re-transcription requests. The re-transcription servlet issues a SOAP request to the Back Office. The Back Office sends a SOAP request to the transcription service, and includes in the message a fidelity level of transcription to use. The transcription service re-transcribes the segment at the requested fidelity level. A reply is sent to the back office with the updated transcription, and the back office issues an event to the billing system to record the re-transcription activity. Next, the back office persists the updated transcription to the back office repository. The web portal server receives the updated transcription and sends that update to the web client either as its response or an event.

While many aspects of this novel system have been illustrated and described in detail in the drawings and foregoing description, the same is to be considered as illustrative and not restrictive in character. The preferred embodiment has been shown and described, but changes and modifications will occur to those skilled in the art based on this disclosure, and these may still be protected.

What is claimed is:

1. A system, comprising a processor and a memory in communication with the processor, the memory storing programming instructions executable by the processor to:
   cause a first chunk of audio data to be played for a first analyst, where the first chunk of audio data represents a segment of a first audio stream, the segment associated with a participant in a conference call;
   accept input from the first analyst sufficient to indicate a transcription of the segment of the first audio stream, the input being dependent upon a selected fidelity mode chosen from a plurality of fidelity modes, the plurality of fidelity modes having corresponding levels of fidelity and including all of:
      a first verbatim interpreting mode wherein the first analyst provides a substantially verbatim transcription of the first audio stream;
      a second text interpreting mode wherein the first analyst listens to the first chunk of audio data and provides input of text that has a substantially identical meaning to the words spoken in the first chunk of audio data; and
      a third automatic transcription mode wherein the first analyst repeats the first chunk of audio as input for an automatic transcription subsystem responsive to the automatic transcription subsystem having a level of confidence below a threshold when provided with the first audio stream as input;
   cause the transcription and an identity of the participant in the conference call to be displayed on a web-based user interface in substantially real time relative to the capture of the segment of the first audio stream;
   determining that the transcription displayed on the user interface is not accurate; and
   automatically, by a computer system and without user input, selecting, based on the levels of fidelity corresponding to the plurality of fidelity modes, a different fidelity mode in the plurality of fidelity modes having a corresponding level of fidelity higher than the selected fidelity mode.

2. The system of claim 1, wherein the programming instructions are further executable to:
   cause additional chunks of audio data to be played for a plurality of analysts that comprises the first analyst, where the first chunk and the additional chunks together represent all of the audio in the first audio stream;
   accept input from the plurality of analysts sufficient to indicate a transcription of the first audio stream; and
   cause the transcription to be displayed on the web-based user interface in substantially real time relative to the parsing of each of the chunk and additional chunks.

3. The system of claim 2, wherein the first chunk and at least one of the additional chunks represent overlapping segments of the first audio stream.

4. The system of claim 2, wherein the programming instructions are further executable to:
   cause further audio chunks of audio data to be played for the plurality of analysts, where the further chunks represent a second audio stream associated with the first audio stream;
   accept input from the plurality of analysts sufficient to indicate a transcription of the second audio stream; and
   cause the transcription of the second audio stream to be displayed on the web-based user interface in substantially real time relative to when each of the further chunks was captured.

5. The system of claim 4, wherein the first audio stream and the second audio stream are produced by different participants in the conference call.

6. The system of claim 1, wherein the parsing chooses low volume points in the stream for the beginning and end of the chunk.

7. The system of claim 1, wherein the audio stream is parsed from a video stream.

8. The system of claim 1, wherein:
   the selected fidelity mode is the text interpreting mode, and the input from the first analyst also indicates the analyst's interpretation of an intent of a person whose voice is represented by the first chunk of audio data; and
   the programming instructions are further executable to respond automatically to the interpreted intent.

9. The system of claim 8, wherein:
   the interpreted intent is to suspend transcription of audio from all audio streams; and
   the automatic response is to suspend transcription of audio from all audio streams until the system receives instruction from a user to resume.

10. The system of claim 9, wherein:
    while transcription is suspended, the system still causes the audio streams to be played for analysts, but
    no transcription is accepted other than an interpretation of the intent of a person to resume transcription.

11. A system comprising a processor and a memory in communication with the processor, the memory storing programming instructions executable by the processor to:
    play each of a plurality of audio chunks, each for at least one of a plurality of analysts, where the audio chunks were each captured from a single line associated with a participant of a conference call, and together represent speech arriving on all lines of the conference call;
    accept, responsive to a selected fidelity mode chosen from a plurality of fidelity modes, input from the plurality of analysts, the input indicating a transcript of each of the plurality of chunks, and collectively indicating a transcript of speech on all lines of the conference call, the plurality of fidelity modes having corresponding levels of fidelity and including all of:
       a first verbatim interpreting mode wherein a first analyst provides a substantially verbatim transcription of a first audio stream;
       a second text interpreting mode wherein the first analyst listens to a first chunk of audio data and provides input of text that has a substantially identical meaning to the words spoken in the first chunk of audio data; and
       a third automatic transcription mode wherein the first analyst repeats the first chunk of audio as input for an automatic transcription subsystem responsive to the automatic transcription subsystem having a level of confidence below a threshold when provided with the first audio stream as input;
    cause the transcript to be displayed on a web-based user interface to at least one participant in the conference call, where the display of the transcript of each chunk occurs in substantially real time relative to the capture of that chunk and includes an identity of the participant of the conference call associated with the line from which the chunk was captured;

determine that the transcript displayed on the user interface is not accurate; and automatically, by a computer system and without user input, selecting, based on the levels of fidelity corresponding to the plurality of fidelity modes, a different fidelity mode in the plurality of fidelity modes having a corresponding level of fidelity higher than the selected fidelity mode.

12. The system of claim 11, wherein the programming instructions are further executable by the processor to:

accept input indicating that the transcript of a chunk is incorrect;

correct the transcript of that chunk; and display the corrected transcript of that chunk.

13. The system of claim 12, wherein the programming instructions executable by the processor to correct the transcript comprise instructions to accept input from an analyst in the plurality of analysts indicating a corrected transcript of the chunk.

14. The system of claim 11, wherein the programming instructions are further executable by the processor to:

accept intent input from at least one of the plurality of analysts, where the intent input indicates the analyst's interpretation of an intent of a conference call participant; and automatically respond to the intent of the conference call participant.

* * * * *

UNITED STATES PATENT AND TRADEMARK OFFICE
CERTIFICATE OF CORRECTION

PATENT NO.         : 9,710,819 B2                         Page 1 of 1
APPLICATION NO.    : 12/618742
DATED              : July 18, 2017
INVENTOR(S)        : Michael Eric Cloran et al.

It is certified that error appears in the above-identified patent and that said Letters Patent is hereby corrected as shown below:

In the Claims
Column 11 Claim 1, Line 25, replace "the words," with -- words --.
Column 11 Claim 1, Line 35-36, replace "the capture," with -- capture --.
Column 11 Claim 2, Line 50, replace "all of the audio," with -- all audio --.
Column 11 Claim 2, Line 55-56, replace "the parsing," with -- parsing --.
Column 12 Claim 6, Line 8, replace "the parsing," with -- parsing --.
Column 12 Claim 6, Line 9, replace "the stream," with -- the first audio stream --.
Column 12 Claim 6, Line 9, replace "the beginning," with -- a beginning --.
Column 12 Claim 6, Line 10, replace "the chunk," with -- the first chunk --.

Signed and Sealed this
Sixth Day of February, 2018

Joseph Matal
*Performing the Functions and Duties of the
Under Secretary of Commerce for Intellectual Property and
Director of the United States Patent and Trademark Office*